Sept. 6, 1938.   R. F. ALDER   2,129,189
MIRROR HOLDER
Filed April 5, 1937
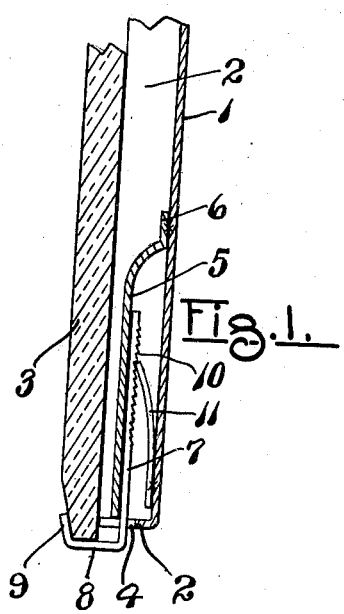
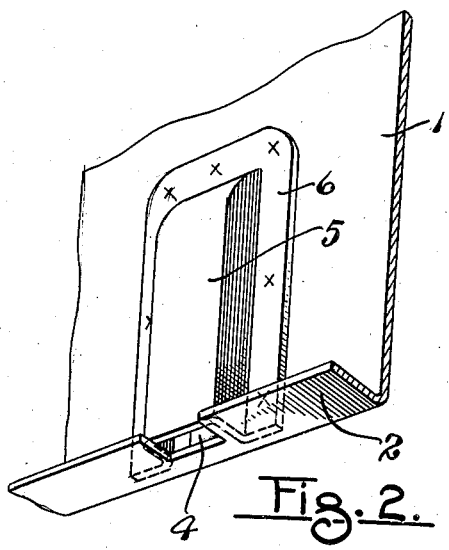
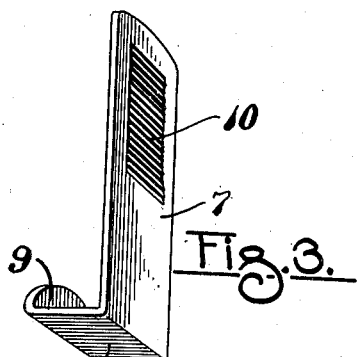
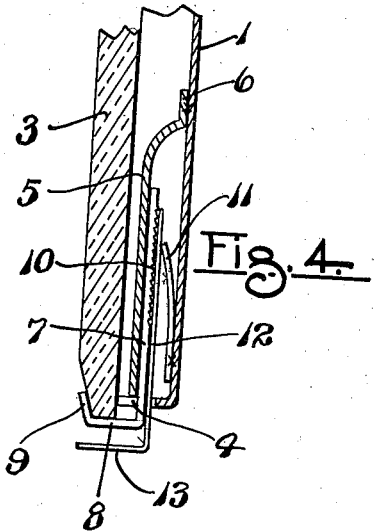
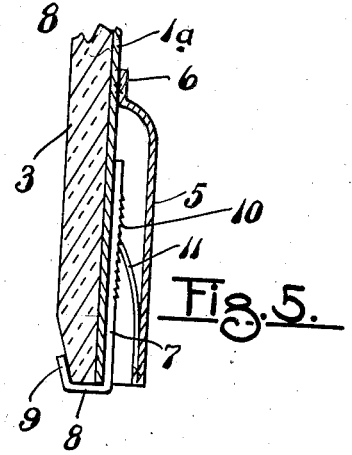
Inventor
Roy F. Alder
By Liverance and Van Antwerp
Attorneys Patented Sept. 6, 1938

2,129,189

UNITED STATES PATENT OFFICE 2,129,189

MIRROR HOLDER

Roy F. Alder, Holland, Mich.

Application April 5, 1937, Serial No. 135,042

2 Claims. (Cl. 88—96)

This invention relates to a mirror holder. It is a primary object and purpose of the present invention to provide a simple and effective means for securing a mirror to a back supporting plate therefor, utilizing a means which is locked to the back and engages the edges of the mirror to hold it securely in position, together with a construction of said locking means whereby it may be quickly and readily unlocked so as to remove the mirror holding means and release the mirror from its backing support whenever desired.

The invention may be understood from the following description, taken in connection with the accompanying drawing, in which, Fig. 1 is a fragmentary vertical section through a side or edge of the supporting back and the mirror attached thereto and illustrating the securing means used, it being understood that a number of such securing devices will be used at spaced apart points around the supporting back and mirror.

Fig. 2 is a fragmentary perspective view of the supporting back showing one place thereon of application of the mirror securing means.

Fig. 3 is a perspective view of one of the mirror engaging hook members.

Fig. 4 is a section similar to Fig. 1 showing the manner in which the hook members may be unlocked for removal to release the mirror from its supporting back, and Fig. 5 is a sectional view similar to Fig. 1, showing a modified form and manner of using my invention in conjunction with a mirror.

Like reference characters refer to like parts in the different figures of the drawing.

With my invention, the back which will serve to support the mirror comprises a sheet metal plate 1 which at each edge has an outturned flange 2, the mirror 3 bearing against the outer edges of the flanges as shown in Figs. 3 and 4. At a plurality of selected places in the flanges 2 around the back 1, openings 4 are made which may extend to the edges of the flanges 2 as shown or may consist of rectangular openings cut in the flanges, either form of opening being equivalent one to the other. In alinement with each of the openings 4 a sheet metal housing 5 of the form shown is secured to the metal back 1, flanges 6 extending from the housing 5 being spot welded or otherwise permanently connected to the back as best shown in Fig. 2. The housing has an open end in conjunction with the opening or slot 4.

The immediate mirror engaging and retaining hook members are made of sheet metal, comprising a bar 7 from which a section 8 is turned at right angles and an angularly disposed lip 9 is bent at the outer end of the section 8, thereby making a hook adapted to engage with an edge of the mirror 3. This member, one being used for each of the openings or slots 4, is inserted through the opening into the housing 5, so as to bring the lip 9 against the beveled edge of the mirror and the section 8 directly against the edge of the mirror. At the inner side of the bar 7 a plurality of consecutive notches or recesses 10 are made and, within the housing 5, a spring dog 11 is spot welded at one end to the back 1 and curves, as shown in Fig. 1, toward the top of the housing 5 so as to automatically engage in said notches 10 as the mirror engaging members are pushed into place.

The mirror engaging members being thus locked to the back 1 and engaging the edges of the mirror securely hold the mirror in place against detachment or accidental disengagement. Such mirror engaging members, however, may be unlocked and removed as shown in Fig. 4. A thin bar of metal is bent to provide two sections 12 and 13 at right angles to each other, the section 12 being relatively long and sections 13 forming a handle therefor. By inserting said part 12 through the opening 4 between the bar 7 and the spring dog 11, the end of the dog is separated from the notches 10 in which it is received, as in Fig. 4, whereupon both the bar 7, with the mirror engaging hook at its outer end, and the unlocking device may be removed by drawing the same outwardly.

In Fig. 5, the backing plate 1a does not have the flanges 2 turned therefrom at its edges and the mirror plate 3 at its rear side may be located directly against the plate. In such case the sheet metal housings 5 are permanently secured as by spot welding their flanges 6 to the rear side of the backing plate 1a, and the springs 11 are secured to the housings 5 instead of to the backing plate. The mirror engaging hook members are inserted into the open ends of the housings, bars 7 riding against the rear side of the plate 1a and with the notches 10 presented to the locking spring dogs 11. The edges of the mirror and the edges of the backing plate are embraced by the hooks of said hook members. In fact, this construction in many respects is a reversal of parts as compared with the structure shown in Fig. 1. It operates in the same manner, the locking and unlocking is accomplished in the same way and in all respects the invention is the same. The unlocking is by inserting the bar 12 in the open end of a housing 5 between the free end of the dog 11 and the notched portion 10 of the bar 7.

This invention is particularly useful in conjunction with the attachment of mirrors to the doors of medicine cabinets, though it is not to be considered that the invention is in any sense limited to this one place of use. While of a simple character the invention is very practical and useful. Should the mirror become defective through loss of the reflecting material with which it is coated at its inner side, as occurs quite frequently, the mirror may be removed and resilvered, or replaced by another. Or, if for any other reason, it is desired that the mirror be removed, it can be very quickly and easily removed and quite as quickly reattached. The invention is defined in the appended claims and is to be considered comprehensive of all forms of structure coming within their scope.

I claim:

1. In a structure of the class described, a back having outturned flanges at its edges, each of said flanges having an opening therethrough, a housing secured to the back and having an open end in conjunction with the opening in said flanges, a mirror located against the edges of said flanges, hook members engaging with the edges of the mirrors, one for each opening in said flanges, each of said hook members having a bar extending through said opening and into the associated housing, said bar having a plurality of consecutive notches in the side thereof adjacent the back, and spring dogs one located within each housing permanently secured to the back and having a free end portion extending to and adapted to automatically engage in the notches in the bar of its associated hook member as said hook member is moved inwardly to engage its hook with an edge of the mirror, said openings adapted to have inserted therethrough and between said dog and said hook member, a releasing member to permit the removal of said mirror.

2. In a construction of the class described, a sheet metal back having outturned flanges at its edges, a mirror located over said back an opening through one of said flanges, mirror engaging members comprising a bar of flat metal formed with a hook at one end to engage with the edges of the mirror, said bar being insertable through the opening in said flange to bring the hook thereof into engagement with the edge of the mirror, and said bar at its inner side having a plurality of transverse notches, an engaging means against which the outer side of the bar has slidable engagement, and a spring dog having a free end portion curved outwardly to engage with the notches in said bar as the same is inwardly inserted.

ROY F. ALDER.